Inventor:
George L. Schwab
By Martin E. Anderson
Attorney

Patented Sept. 23, 1941

2,256,794

UNITED STATES PATENT OFFICE 2,256,794

ELECTRIC LIGHTING GENERATOR FOR VELOCIPEDES

George L. Schwab, Denver, Colo.

Application November 15, 1940, Serial No. 365,738

2 Claims. (Cl. 171—209)

This invention relates to electric generators for velocipedes and has for its object to provide a simple form of self-contained generator which is completely protected against weather conditions and against accidental damage and which is positioned entirely within the hub of one of the wheels of the velocipede and driven by the latter.

The improvement in permanent magnets which has lately been made makes it possible to make generators of comparatively small size and large capacity and this, in turn, makes it possible to construct a generator of sufficient capacity to produce current for the illumination for lights for velocipedes, of such small size that the entire generator can be positioned in the hollow hub of the front wheel of a bicycle or velocipede. I am aware that generators have previously been designed for producing current for operating the lights of a bicycle and I do not claim to be the inventor of this idea in its broadest aspect.

The object of this invention is to produce a generator of a simple construction that can be mounted on a straight shaft such as is ordinarily used in connection with bicycles and in which the generator is entirely independent of the hub in which it is mounted.

Another object of the invention is to produce a generator of a very simple construction that can be readily built onto the shaft before the latter is inserted in the hub and in which the driving force is transmitted from the wheel to the generator rotor by means of a one way friction clutch which may be a pawl and ratchet mechanism or some other equivalent means.

A further object of this invention is to produce a generator of such construction that the shaft can serve as a conduit through which one end of the armature coil can be led to the outside of the wheel in such a way as to be fully protected from injury and in which the wire is not subjected to any rotary action relative to the shaft.

The above and other objects that may become apparent as this description proceeds are attained by means of a construction and an arrangement of parts that will now be described in detail, and for this purpose reference will be had to the accompanying drawing in which the invention has been illustrated in its preferred form, and in which.

Figure 1:
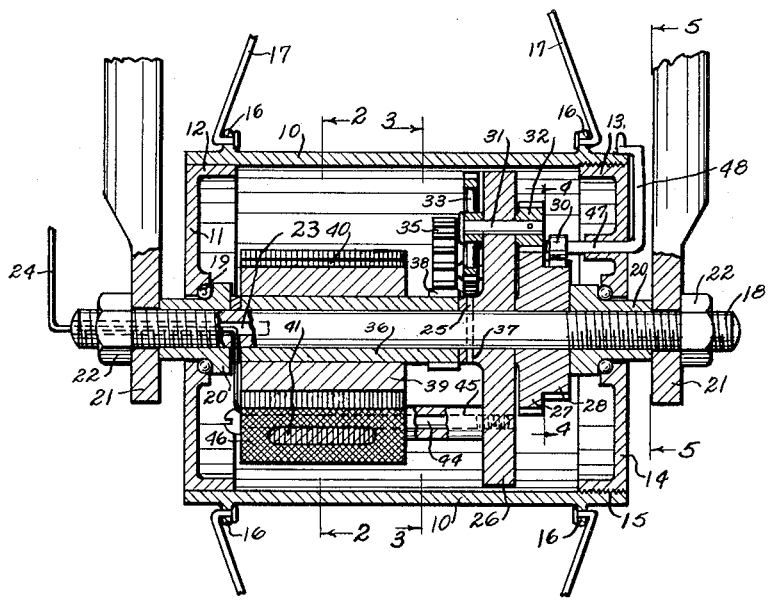
Figure 1 is a diametrical section taken on line 1—1, Figure 2.
Figure 3:
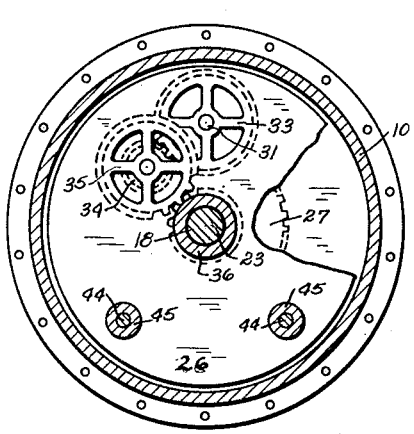
Figure 3 is a transverse section taken on line 3—3, Figure 1.
Figure 2:
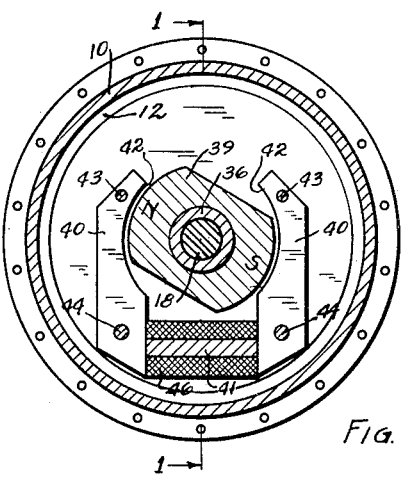
Figure 2 is a transverse section taken on line 2—2, Figure 1.

In the drawing reference numeral 10 designates a cylindrical tubular member, one end of which is closed by means of a circular end 11 whose edge is flanged as indicated by 12, so as to receive one end of the member 10. The flange 12 may be welded to the end of the tubular member 10, as shown in the drawing. The other end of tubular member 10 is preferably threaded as indicated by reference numeral 13 and this threaded end is closed by a circular end member 14 having a peripheral flange 15 externally threaded to receive the threaded end, all as shown in Figure 1. Member 10 is preferably provided with spaced circular ribs 16 that are perforated at angularly spaced intervals for reception of the spokes 17. A shaft 18 extends through openings in the end members and the inner surfaces of the end members are provided with ball races 19. Threadedly connected with the ends of the shaft are elongated ball races 20 whose outer ends serve as an abutment for the lower perforated ends 21 of the fork in which the bicycle wheel is carried. Nuts 22 serve to clamp the fork in position. The shaft is provided with a central opening 23 through which the conductor 24 passes from the inside of the hub to the outer end of the shaft in the manner shown in Figure 1. Secured to the shaft and held against both longitudinal and rotary movement relative thereto by means of a pin 25 is a disk 26. This disk serves as a support for the stationary armature of the generator and also for certain gears to which reference will hereinafter be made. Positioned in the space between the tubular ball race 20 shown at the right in Figure 1 and the opposing surface of the disk 26 is a spur gear 27. This gear has one side provided with a hub 28 which has one or more notches 29 that cooperate with a pawl 30 of a ratchet mechanism to which reference will hereinafter be made. A short shaft 31 is mounted for rotation in a suitable bearing in disk 26 and has secured to one end thereof a spur pinion 32 that meshes with spur gear 27. On the other side of disk 26 and secured to the end of shaft 31 is a spur gear 33 that meshes with a pinion 34 formed on the hub of spur gear 35. A sleeve 36 is mounted for rotation on the shaft and held against longitudinal movement by the inner end of the tubular ball race 20 which is shown to the left in Figure 1 and by the end of the hub 37 which is formed integral with the disk 26. Sleeve 36 has one end provided with gear teeth 38 that are in mesh with the spur gear 35. It is evident from the drawing that when the parts are in the position shown and the ends 21 of the wheel fork are clamped between the nuts 22 and the outer ends of the tubular ball races, the shaft will not rotate and therefore the disk 26, together with the pinion 32, and spur gears 33 and 35 do not turn about the shaft, but are held in a predetermined position relative thereto. It is therefore evident that whenever the spur gear 27 is rotated, it will rotate sleeve 36 at an increased speed. Secured on sleeve 36 is a permanent electromagnet 39 of oblong shape. This magnet is made of a newly discovered alloy which has the property of becoming very highly magnetized and of retaining the high degree of magnetism. The magnet 39 forms the rotatable field of a generator whose armature is formed by a plurality of soft iron laminations of substantially U-shape. Each lamination has an arm 40 and these arms are connected by means of a core portion 41. The opposed surfaces of the arms are curved about a common center as indicated by reference numeral 42. The diameter of the inner surfaces 42 is slightly larger than the diameter of the electromagnet so that the latter may rotate freely therein in a manner indicated in Figure 2. The laminations of the stationary armature are held together by rivets 43 and the armature is secured to disk 26 by means of two or more bolts 44 that extend through spacers 45. In the drawing two bolts 44 have been shown, but more securing bolts may be used if desired. The core 41 is surrounded by a coil of insulated wire 46, one end of this coil may be grounded and the other end extends through an opening in the shaft and terminates at the end of the shaft as indicated by reference numeral 24. The conductor 24 may be extended and connected with the headlight of the bicycle and the current can return to the armature coil through the frame in the usual manner.

It will be observed from the drawing and from the description that the generator parts can all be assembled on the shaft before the latter is inserted into the hub and that the cost of manufacture and assembly is therefore reduced to a minimum.

Particular attention is called to the specific construction illustrated, because it is the object of this invention to produce a generator for the purpose indicated that shall be of such simple and rugged construction that it can be manufactured at a comparatively small cost and which will withstand the rough usage to which generators of this type may be subjected.

The construction of the hub has been indicated more or less diagrammatically as this forms no part of the invention when specifically considered. The construction of the bearings is also more or less diagrammatic and it is to be understood that the specific details, except those pertaining to the generator construction, may be replaced by others whenever desired.

Figures 4, 5:
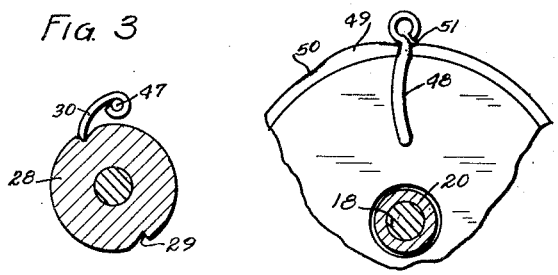
Figure 4 is a section taken on line 4—4, Figure 1.
Figure 5 is a fragmentary end elevation taken on line 5—5, Figure 1.

When a bicycle or a velocipede wheel is provided with a generator of the type herein shown and described, the generator can be made to function whenever desired by merely moving the pawl 30 into operative position. It will be observed from the drawing that the pawl 30 is secured to a shaft 47 which in the embodiment illustrated comprises a spring wire whose outer end 48 is bent upwardly as shown in Figure 5. The outer end of part 48 is bent inwardly and can be moved over the hump 49 so as to be positioned in either one of the depressions 50 and 51.

Whenever the generator is to be put into operation, the pawl is manipulated to bring it into operative position. The construction of the pawl and its operative mechanism is diagrammatic only and is intended to illustrate one embodiment of means for this purpose and is not to be considered a limitation, for it is evident that a large number of different expedients may be resorted to to provide a power transmission mechanism between the rotatable hub and the spur gear 27.

Attention is directed in particular to the fact that the entire generator is attached to the shaft and forms a unitary assembly separate from the hub, the only connection with the hub or wheel being the clutch mechanism that has been illustrated as a pawl and ratchet. If one of the generator parts were attached to the hub, the parts would get out of alignment with wear.

Having described the invention, what is claimed as new is:

1. An electric generator assembly comprising, a frame having two spaced supporting members, a shaft extending between the members and nonrotatably secured thereto, a driving member rotatably mounted on the shaft adjacent one supporting member, a plate nonrotatably attached to the shaft and spaced from the driving member, a spur gear rotatably mounted on that portion of the shaft between the plate and the driving member, a sleeve rotatably mounted on the shaft on the side of the plate opposite from the spur gear, the end of the sleeve adjacent the plate having gear teeth, means comprising a one way clutch mechanism for transmitting motion from the driving member to the spur gear, means comprising a gear train carried by the plate for transmitting motion from the spur gear to the sleeve, a permanent magnet carried by the sleeve, and an armature comprising a wire enclosed core of magnetic material carried by the plate and positioned adjacent the electromagnet in position to be subjected to a flux variation when the magnet is rotated.

2. A generator for velocipedes, comprising, a frame, a straight shaft secured at its ends to the frame and held from rotation, a housing having spaced sides journaled on the shaft, a plate nonrotatably attached to the shaft and spaced from one of the sides, a spur gear mounted for rotation on that part of the shaft between the plate and one side of the housing, means for effecting a power transfer from the housing side to the spur gear, said means comprising a one way clutch mechanism, a sleeve rotatably mounted on that part of the shaft between the plate and the other housing side, the end of the sleeve nearest the plate having gear teeth, means comprising a gear train carried by the plate for transmitting movement from the spur gear to the sleeve, a permanent magnet carried by the sleeve, a U-shaped armature attached to one side of the plate and so positioned that it embraces the permanent magnet, whereby when the sleeve and magnet rotate relative to the armature a magnetic flux variation will be produced therein, and a coil of insulated wire surrounding the armature.

GEORGE L. SCHWAB.